Patented Apr. 19, 1932

1,854,395

UNITED STATES PATENT OFFICE

JAMES D. CUMMINGS, OF HOUSTON, TEXAS, ASSIGNOR TO W-K-M COMPANY, INC., OF HOUSTON, TEXAS

PIPE COATING APPARATUS

Application filed January 12, 1929. Serial No. 332,147.

My invention relates to an apparatus for applying a protective coating to pipe, such as is employed for conducting water, gas, oil, and the like.

It has been found that the life of fluid-conducting pipes, such as are employed for water and gas mains, or for conducting crude oil in pipe line work, is greatly prolonged by applying a protective coating to the outer surface thereof before the pipes are laid in the ditches. The lengths of pipe which are to be laid in the ditch, so as to be secured together to form a continuous conducting line of pipe, are welded together at their ends or may be attached by removable couplings of different types. The coating is usually applied before the pipes are laid in the ditch and, after they have been joined together at the joints, the joint itself is covered with a layer of protective material. It is difficult, with the ordinary hand apparatus, to keep the pipe clean and properly apply the coating thereto, and it is an object of my invention to provide an apparatus which may be employed to coat the pipe quickly and uniformly and to allow the application thereto of a wrapping of protective material.

I desire to improve over the ordinary method of applying the coating to the pipe by hand, where a large amount of the coating material is wasted, by rotating the pipe in contact with a bath of the coating material so that no portion of the coating material may be wasted and whereby also the layer of material may be made uniform throughout the length of the pipe.

I also desire to simultaneously apply a wrapping of the protective material and of the liquid coating so that an economy of time and material may be accomplished.

The invention resides largely in the particular construction and arrangement of the parts whereby the results previously mentioned are accomplished and reference is made to the drawings whereby a preferred embodiment of the invention is disclosed.

In the drawings, Fig. 1 is a side elevation of a device constructed in accordance with my invention, the parts being shown somewhat diagrammatically.

Figure 1:
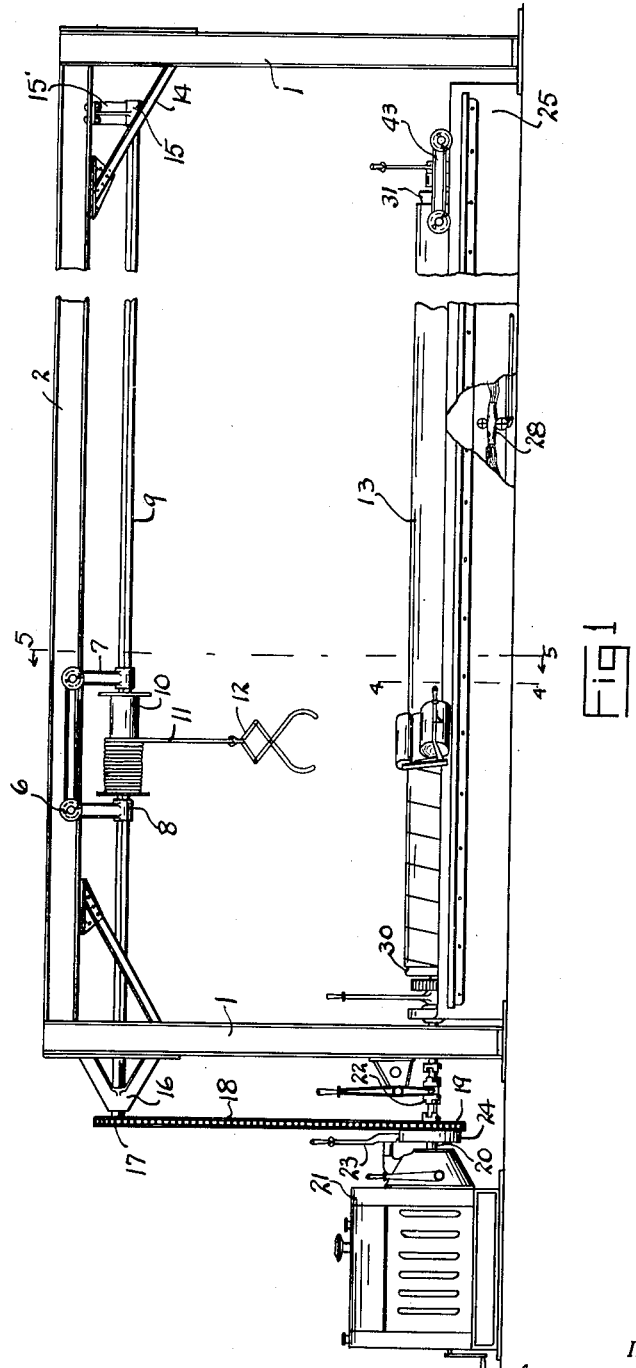
Figure 5:
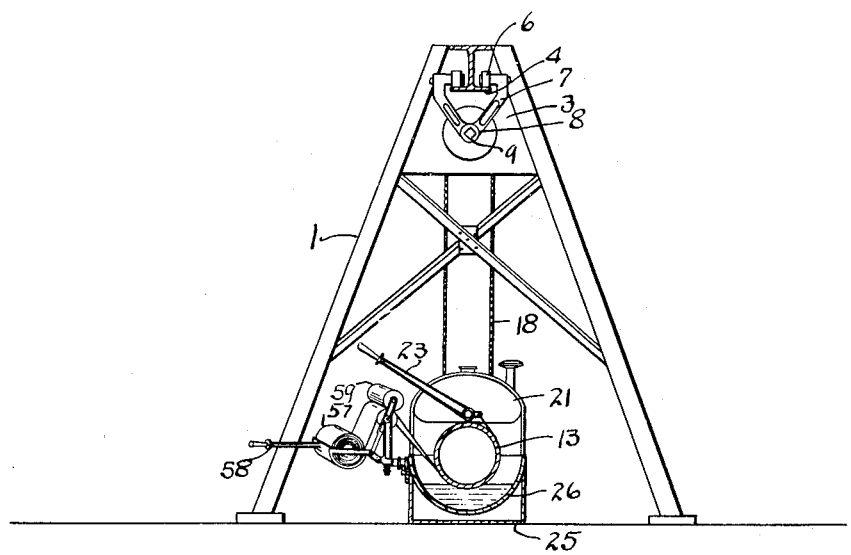
Fig. 5 is a vertical section through the complete device taken on the plane 5—5 of Fig. 1.

In the drawings I have shown in Figs. 1 and 5 an apparatus which is intended for stationary work, but it is to be understood that this device may be assembled on some portable means whereby it may be moved from place to place without in any manner departing from the spirit of the invention. I have shown two end supports 1 connected by a longitudinal I-beam 2 at their upper ends. The supports 1 are best understood from Fig. 5. There are two legs converging toward their upper ends and connected by means of gusset plates 3. These end supports are joined to the I-beam 2. The lower web 4 forms a track upon which a carriage may move. Said carriage has a pair of opposite rollers 6 at each end, said rollers being spaced apart to rest upon the opposite sides of the I-beam and are mounted upon a hanger 7, which is approximately V-shaped the lower angle of which is connected to a sleeve 8 slidable on a rotatable shaft 9, which is squared in cross section. Between the two hangers is a drum or winch 10, which is mounted to rotate with the shaft 9. A cable 11 wound upon said drum has suspended at its lower end a pipe engaging device 12 of any preferred construction. This winch thus mounted is movable to different positions longitudinally of the frame and may be employed to engage and lift the pipe indicated at 13 so that it may be acted upon by the coating device which will be later described. The frame of the device is braced by angle irons or other similar devices shown at 14.

The shaft 9 is supported for rotation at both ends. At the rearward end of the machine the bearing 15 is suspended from a hanger 15' connected to the lower side of the I-beam 2. The other end of the shaft is extended beyond the frame and is supported in a bearing 16 and has a sprocket wheel 17 thereon, through which rotation may be communicated to the shaft by means of a sprocket chain 18 engaging the wheel 19 on the shaft 20 of the motor 21.

The motor 21 may be of any desired type, and an internal combustion engine is shown, but an electric motor or steam car may be employed if desired. The wheel 19 is idle on the shaft and may be connected operatively with the shaft by means of the clutch 22. A brake lever 23 is provided for applying the usual friction brake upon the drum 24, connected with the wheel 19.

Figure 4:
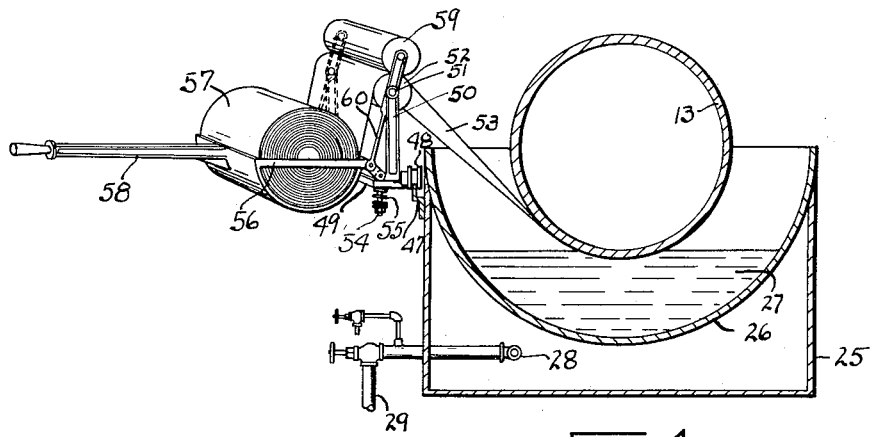
Fig. 4 is a similar transverse section through the pipe taken on the plane 4—4 of Fig. 1 and looking in the direction of the arrows.

The coating device includes a tank extending approximately the full length of the frame and mounted adjacent the base thereof. The tank includes an outer housing 25, which, as shown in Fig. 4, is approximately rectangular in shape. This housing may be of sheet metal or brick or any desired material. It constitutes a support for the semi-cylindrical tank 26 and it is to be understood that the material indicated at 27 in said tank may be of any desired type of coating material and where an asphaltic composition is employed it is desirable to heat the tank, and this will be accomplished by a fuel burner 28 extending through the side walls of the housing to a position below the tank. Said burner is adapted to burn either liquid or gaseous fuel and is connected to a supply pipe 29 extending to any source of supply not shown.

Figure 2:
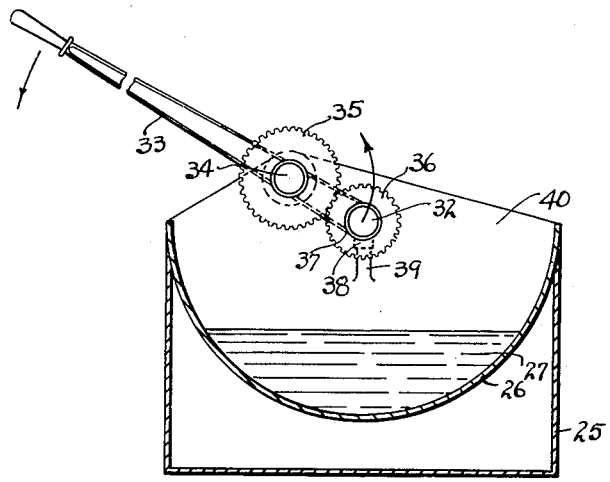
Fig. 2 is a transverse section through the device adjacent the forward end of the tank in which the coating is received.

The pipe 13 is adapted to be placed in the tank 26 in contact with the upper surface of the coating material 27 and rotated for application of the coating to the pipe surface. To accomplish this, the pipe is preferably mounted at its ends upon chucks 30 and 31. The forward chuck 30 is mounted upon a shaft 32 which is supported at its forward end by a bar or lever 33 pivoted at 34 upon the forward end of the shaft of the motor. The motor shaft has a gear 35 thereon meshing with a gear 36 upon the chuck shaft 32. The lower side of the bearing 37 of the chuck shaft has a projection 38 adapted to seat upon a lug 39 on the end wall 40 of the tank. This limits the downward movement of the chuck and the pipe. However, the pipe may be raised upwardly out of the tank by depressing the lever 33, as indicated in Fig. 2.

Figure 3:
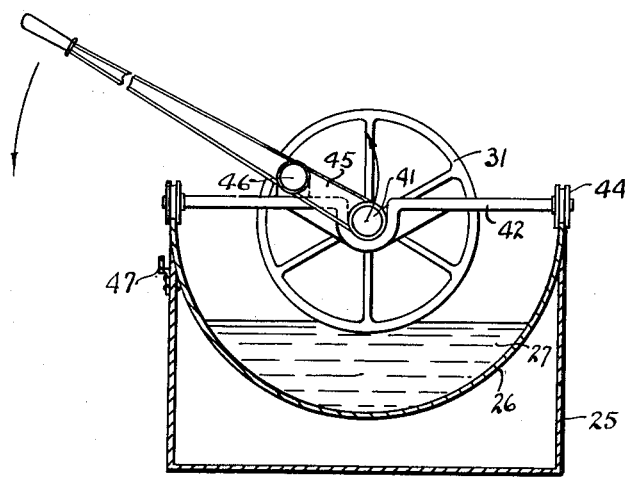
Fig. 3 is a similar section through the opposite end of the said tank.

The opposite end of the pipe is supported on the chuck 31, as previously noted, and provision is made for the movement of the chuck 31 longitudinally of the pipe so that it may be introduced into the pipe after the pipe has been supported at its opposite end. The chuck is mounted upon a shaft 41 which is supported in a transverse frame member 42, connected at its ends to a frame 43. Said frame is supported to move upon the upper side of the tank through rollers or wheels 44, shown best in Fig. 3. This chuck 31 is also supported in such manner that it may be raised from the tank in a manner similar to the mounting of the forward chuck. The shaft 41 is mounted to rotate in the lower end of a bar or lever 45 pivoted at 46 upon the supporting member 42.

While the pipe is rotated through the apparatus just described I contemplate wrapping a web or sheet of protective material thereon and, in order to apply the wrapping thereto quickly and conveniently, I propose to employ the device shown best in Fig. 4. On the side of the housing 25, adjacent the upper edge thereof, is a track 47, which may be of angle iron construction, spacing the upper edge of the track sufficiently from the wall of the housing to receive a pair of rollers or wheels 48. These wheels are connected by a frame member 49 extending between the wheels. At each end of the frame is an upright post 50 having a bearing at its upper end for a shaft 51 of a guide roller 52 for the web 53 of wrapping material. The posts 50 are connected at their lower ends and are pivotally secured to the frame member 49 by a downwardly extending pin 54 having a friction spring 55 thereon which tends to resist rotation of the upper frame upon the lower frame member 49.

Connected with the frame thus constructed is a roll supporting housing 56 having the roll 57 of wrapping material rotatable thereon. A handle 58 on the roll supporting frame serves as a handle whereby the workmen may push the roll and frame along the track 47 and also vary the angle of the roll relative to the track. An upper guide roll 59 is mounted above the roll 52 and is supported by a pair of arms 60 connected at their lower ends to the frame 56. The construction of this feeding device for the wrapping material forms the subject of a separate application, Serial No. 332,310; filed January 14, 1929, and need not be more particularly described.

In the operation of my device the pipe may be moved to a position adjacent the tank and the pipe engaging device 12 may be secured to the pipe and the motor operated to reel up the cable 11 and move the pipe into a position above the vat or tank 26, so that it may be inserted over the end of the forward chuck 30. The rearward chuck 31 may then be moved into the opposite end of the pipe and there secured. The chucks employed may be of any well known type of chuck, either expanding or otherwise, and adapted to rotate with the shafts upon which they are mounted. In inserting the chucks into the ends of the pipe the levers 33 and 45 may be raised or lowered as becomes necessary to properly register the chucks with the ends of the pipe.

The chucks are rotatable, as will be understood, through engagement of the gear 36 upon the chuck shaft 32, with the gear 35 upon the motor shaft. This engagement will be an operative one even when the pipe is raised from its position in the tank. It is contemplated that the fluid level in the tank will be maintained at a height so that the lower surface of the pipe when thus mounted will contact with the upper surface of the liquid coating.

When the pipe is rotated a uniform layer of coating material will be applied thereto and I contemplate that this may be made uniform by any desired means, such as a wiper or squeegee.

When the coating has been properly applied the web of wrapping material 53 will be wound spirally about the pipe. This wrapping material is a specially prepared material of paper or felt. It is secured at one end of the pipe and as the pipe is rotated the operator moves the carriage along the track 47 at a proper speed to secure an even and uniform application of the wrapping to the pipe. It is necessary to position the roll of wrapping material at an angle to the pipe in order that the winding in a spiral manner at the pipe may be made smooth and even. The operator will be able to adjust this angle in accord with the speed of rotation of the pipe so that the wrapping material may be properly applied.

When the pipe has been thus wrapped it may be coated further, if desired, and then removed from the tank ready for laying in the ditch.

It will be obvious that my apparatus makes it possible to apply the coating uniformly and quickly without a waste of material. Furthermore, the wrapping of the pipe is also easily accomplished through the use of the same pipe rotating means. An economy of time and material will be thus accomplished.

Having thus described my invention, what I claim is new and desire to protect by Letters Patent is:

1. In a device of the character described, a liquid coating containing tank, pipe engaging chucks journalled to rotate in said tank, means including levers having said chucks mounted for rotation thereon to move said chucks into and from said tank, and means to rotate said chucks.

2. A device of the character described including a tank for liquid coating material, means to move a pipe to a position above said tank, means to engage said pipe for rotation and means to rotate said pipe, said means to engage the pipe being adjustable for movement into or out of said tank.

3. A device of the character described including a tank for liquid coating material, means to move a pipe to a position above said tank, means to engage said pipe for rotation, means to move said pipe engaging means to a position in said tank, and means to rotate said pipe.

4. A tank for liquid coating, pipe engaging chucks mounted on said tank, means to rotate one of said chucks, including a drive shaft, a lever pivoted on said shaft, a chuck shaft on the end of said lever, and a chuck driving gear on said chuck shaft and a drive gear on said drive shaft in mesh with said chuck gear so that movement of said lever will elevate or depress said chuck shaft with respect to said tank.

In testimony whereof I hereunto affix my signature this 5th day of January, A. D. 1929.

JAMES D. CUMMINGS.